US012767156B2

(12) United States Patent
Bandi et al.

(10) Patent No.: US 12,767,156 B2
(45) Date of Patent: Oct. 20, 2026

(54) VEHICLE SENSOR MODE TRANSITIONS

(71) Applicant: Ford Global Technologies, LLC, Dearborn, MI (US)

(72) Inventors: Krishna Bandi, Farmington Hills, MI (US); Swetha Shailendra, Royal Oak, MI (US); Helen E. Kourous-Harrigan, Monroe, MI (US); Nancy Lewis, Ann Arbor, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 627 days.

(21) Appl. No.: 17/839,005

(22) Filed: Jun. 13, 2022

(65) Prior Publication Data

US 2023/0399001 A1 Dec. 14, 2023

(51) Int. Cl.
*B60W 50/035* (2012.01)
*B60W 50/02* (2012.01)

(52) U.S. Cl.
CPC ...... *B60W 50/035* (2013.01); *B60W 50/0205* (2013.01); *B60W 50/0225* (2013.01); *B60W 2050/0215* (2013.01); *B60W 2510/305* (2013.01); *B60W 2520/04* (2013.01); *B60W 2555/60* (2020.02); *B60W 2556/45* (2020.02)

(58) Field of Classification Search
CPC ........... B60W 50/035; B60W 50/0205; B60W 50/0225; B60W 2050/0215; B60W 2510/305; B60W 2520/04; B60W 2555/60; B60W 2556/45; B60W 10/26; B60W 2050/021; B60W 30/18054
See application file for complete search history.

(56) References Cited

U.S. PATENT DOCUMENTS 10,861,330 B2 12/2020 Sun
10,957,192 B2 3/2021 Bandi et al.
11,753,036 B1 * 9/2023 Wimmershoff ........... B60L 1/00 701/22
12,135,565 B2 * 11/2024 Pan ........................ G05D 1/227
12,461,210 B2 * 11/2025 O'Donnell .............. G01S 7/497
2013/0159749 A1 * 6/2013 Moeglein .......... H04W 52/0245 713/323
2017/0088072 A1 * 3/2017 Curtis .................... G08B 31/00
2018/0215386 A1 * 8/2018 Naserian ........... B60W 50/0097
2019/0236862 A1 * 8/2019 Mercep ................ B60W 30/09
2020/0009970 A1 1/2020 Yi
2020/0156641 A1 * 5/2020 Kretschmann .... B60W 50/0097
2020/0339124 A1 10/2020 Vassilovski et al.
2021/0183244 A1 6/2021 Malhan et al.
2022/0126832 A1 * 4/2022 Ewert ................... B60W 10/24
2025/0252743 A1 * 8/2025 Panthri ................... H04W 4/02

OTHER PUBLICATIONS

Ayoub, "Traffic Signals and Connected Vehicles", © 2017 Iteris, Inc.

* cited by examiner

*Primary Examiner* — Anne Marie Antonucci
(74) *Attorney, Agent, or Firm* — Vincent Mastrogiacomo; Brooks Kushman P.C.

(57) ABSTRACT

Upon determining that a vehicle is operating within an area, a stop time for the vehicle in the area is estimated based on operation data from an infrastructure element in the area. A vehicle sensor that is available to transition to a low power mode is identified based on the estimated stop time. Upon stopping the vehicle in the area, the available vehicle sensor is transitioned to the low power mode based on the estimated stop time being greater than a threshold.

21 Claims, 6 Drawing Sheets

VEHICLE SENSOR MODE TRANSITIONS

BACKGROUND

Vehicles can be equipped with computing devices, network devices, sensors and controllers to acquire data regarding the vehicle's environment and to operate the vehicle based on the data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated on a roadway.

DETAILED DESCRIPTION

Figure 1:
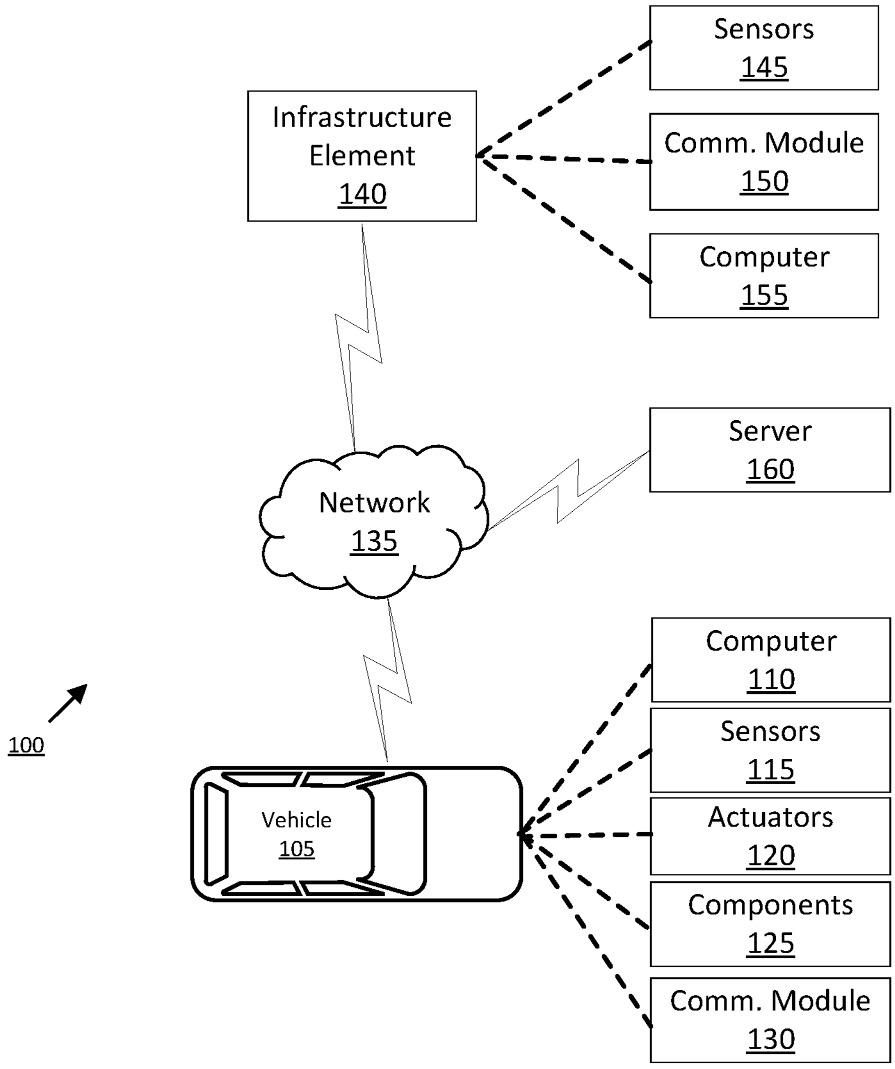
FIG. 1 is a block diagram illustrating an example control system for a vehicle.

A vehicle can include a plurality of sensors that draw power from a power supply to obtain data regarding the environment around the vehicle and provide the data to a vehicle computer. The vehicle computer can operate the vehicle based on the sensor data. However, the sensors may continue to draw power from the power supply when data may not be used to operate the vehicle, e.g., when the vehicle is stopped at a traffic signal. In this situation, the sensors may increase power consumption from the power supply, thereby preventing the power supply from having a sufficient state of charge to power other vehicle components. Further, transitioning the sensors to a low power mode may be inefficient if the sensors are transitioned back to a standard power mode within a certain amount of time. That is, transitioning the sensors from the low power mode to the standard power mode within a certain amount of time may fail to reduce power consumption from the power supply by the sensors.

Advantageously, as described herein, the vehicle computer can provide an energy-efficient way to transition one or more vehicle sensors between the standard power mode and the low power mode. To provide the energy-efficient monitoring, the vehicle computer can estimate a stop time for a vehicle in an area based on operation data from an infrastructure element in the area. The vehicle computer can then identify a vehicle sensor that is available to transition to the low power mode based on the estimated stop time. Upon stopping the vehicle, the vehicle computer can then transition the available sensor to the low power mode based on the estimated stop time being greater than a threshold. Transitioning the available sensor to the low power mode when the estimated stop time is greater than the threshold can prevent or reduce power consumption by the sensor, thereby reducing power consumed from the battery.

A system comprises a computer including a processor and a memory, the memory storing instructions executable by the processor programmed to: upon determining that a vehicle is operating within an area, estimate a stop time for the vehicle in the area based on operation data from an infrastructure element in the area; identify a vehicle sensor that is available to transition to a low power mode based on the estimated stop time; and upon stopping the vehicle in the area, transition the available vehicle sensor to the low power mode based on the estimated stop time being greater than a threshold.

The instructions can further include one or more of instructions to determine the estimated stop time based additionally on signal phase and timing (SPaT) data for a traffic signal in the area; to determine the operation data based on a time of day; to receive the operation data from the infrastructure element; to transition the available vehicle sensor to a standard power mode based on determining a remaining stop time is less than or equal to the threshold; to determine the remaining stop time based on the estimated stop time and an amount of time elapsed after stopping the vehicle; to transition the available vehicle sensor to the low power mode based additionally on verifying vehicle operation with the available vehicle sensor in the low power mode.

The infrastructure element can include an infrastructure sensor positioned to monitor the area, and wherein the instructions further include instructions to verify vehicle operation with the available sensor in the low power mode by inputting data from the infrastructure sensor and data from other vehicle sensors in a standard power mode to a neural network that outputs a verification status of vehicle operation.

The instructions can further include one or more of instructions to identify the available vehicle sensor based additionally on data obtained from the available vehicle sensor in a standard power mode; to, upon identifying a fault associated with the available vehicle sensor, transition the available sensor to a maintenance mode based on the estimated stop time being greater than the threshold; to identify the fault associated with the available sensor based on data obtained from the available vehicle sensor in a standard power mode; to provide the data obtained from the available vehicle sensor to a remote computer; to provide, to a remote computer, a message specifying the identified fault; to calibrate the available vehicle sensor in the maintenance mode; to reset the available vehicle sensor in the maintenance mode.

A method comprises upon determining that a vehicle is operating within an area, estimating a stop time for the vehicle in the area based on operation data from an infrastructure element in the area; identifying a vehicle sensor that is available to transition to a low power mode based on the estimated stop time; and upon stopping the vehicle in the area, transitioning the available vehicle sensor to the low power mode based on the estimated stop time being greater than a threshold.

The method can further comprise one or more of identifying the available vehicle sensor based additionally on data obtained from the available vehicle sensor in a standard power mode; upon identifying a fault associated with the available vehicle sensor, transitioning the available sensor to a maintenance mode; transitioning the available vehicle sensor to the low power mode based additionally on verifying vehicle operation with the available vehicle sensor in the low power mode; transitioning the available vehicle sensor to a standard power mode based on determining a remaining stop time is less than or equal to the threshold.

With reference to FIGS. 1-4, an example traffic infrastructure system 100 includes an infrastructure element 140 and a vehicle 105. A vehicle computer 110 in the vehicle 105 receives data from sensors 115. The vehicle computer 110 is programmed to, upon determining that the vehicle 105 is operating within an area 205, estimate a stop time for the vehicle 105 in the area 205 based on operation data from an infrastructure element 140 in the area 205. The vehicle computer 110 is further programmed to identify a vehicle sensor 115 that is available to transition to a low power mode based on the estimated stop time. The vehicle computer 110 is further programmed to, upon stopping the vehicle 105 in the area 205, transition the available vehicle sensor 115 to the low power mode based on the estimated stop time being greater than a threshold.

Turning now to FIG. 1, the vehicle 105 includes the vehicle computer 110, sensors 115, actuators 120 to actuate various vehicle components 125, and a vehicle 105 communication module 130. The communication module 130 allows the vehicle computer 110 to communicate with a remote server computer 160, infrastructure elements 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above and/or may include a dedicated electronic circuit including an ASIC that is manufactured for a particular operation, e.g., an ASIC for processing sensor 115 data and/or communicating the sensor 115 data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communication network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, actuators 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor 115(*s*), etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g., front view, side view, etc., providing images from an area surrounding the vehicle 105. As another example, the vehicle 105 can include one or more sensors 115, e.g., camera sensors 115, mounted inside a cabin of the vehicle 105 and oriented to capture images of users in the vehicle 105 cabin. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115, e.g., substantially continuously, periodically, and/or when instructed by a remote computer 160, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 105, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, i.e., comprising pixels, typically with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle 105 subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote computer 160 (typically via direct radio frequency communications). The communication module could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module include cellular, Bluetooth, IEEE 802.11, Ultra-Wideband (UWB), Near Field Communication (NFC), dedicated short range communications (DSRC), and/or wide area networks (WAN), including the Internet, providing data communication services.

The network 135 represents one or more mechanisms by which a vehicle computer 110 may communicate with remote computing devices, e.g., the remote computer 160, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks 135 include wireless communication networks (e.g., using Bluetooth®, Bluetooth® Low Energy (BLE), UWB, NFC, IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of infrastructure elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each infrastructure sensor 145 is mounted to the infrastructure element 140 so as to have a substantially unmoving and unchanging field of view.

Infrastructure sensors 145 thus provide field of views in contrast to vehicle 105 sensors 115 in a number of advantageous respects. First, because infrastructure sensors 145 have a substantially constant field of view, determinations of vehicle 105 and object locations can be accomplished with fewer and simpler processing resources than if movement of the infrastructure sensors 145 also had to be accounted for. Further, the infrastructure sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, infrastructure sensors 145 can communicate with the infrastructure element 140 computer 155 via a wired connection, whereas vehicles 105 typically can communicates with infrastructure elements 140 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

The remote server computer 160 can be a conventional computing device, i.e., including one or more processors and one or more memories, programmed to provide operations such as disclosed herein. Further, the remote server computer 160 can be accessed via the network 135, e.g., the Internet, a cellular network, and/or or some other wide area network.

Figure 2A:
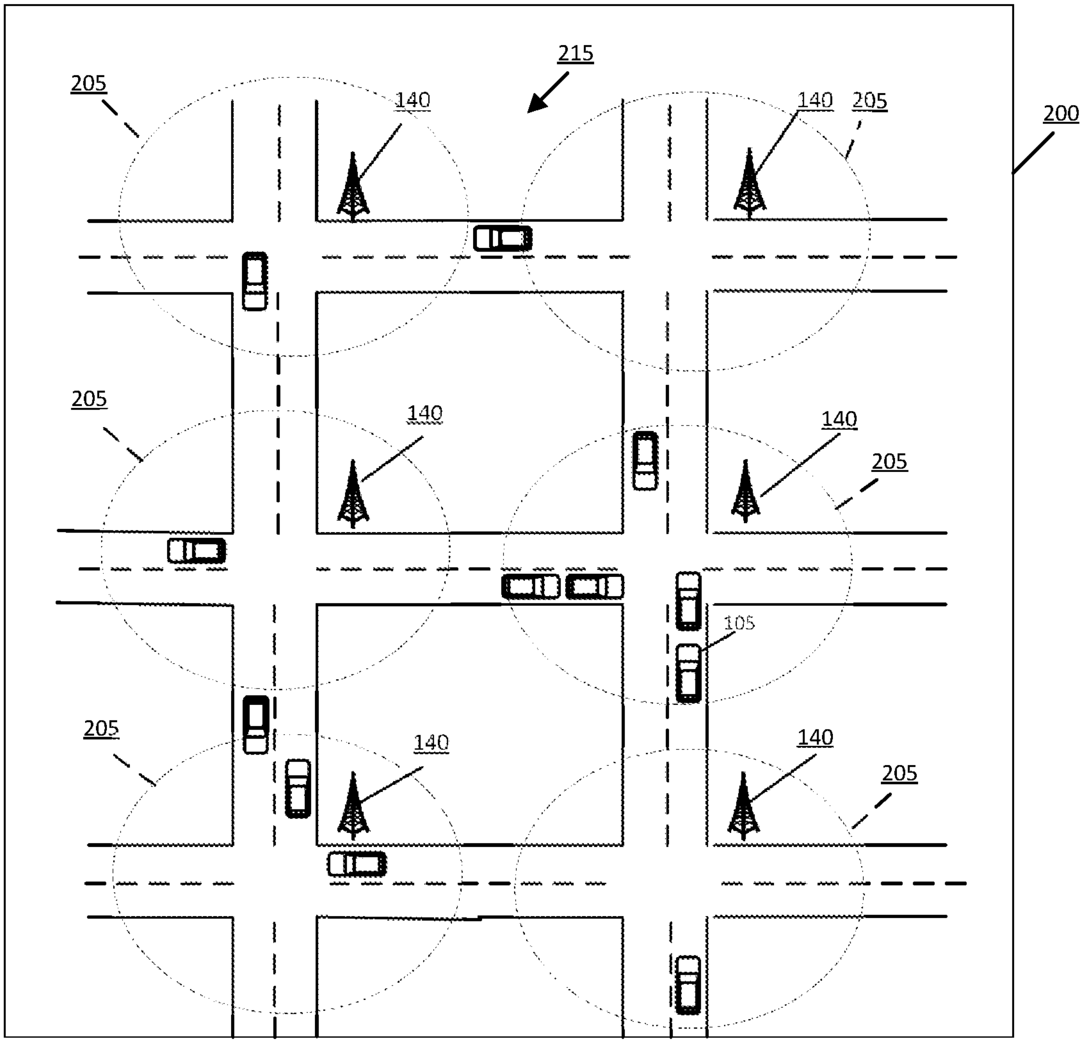
FIG. 2A is a diagram illustrating an example region area in which the system of FIG. 1 would be implemented.

FIG. 2A is a diagram illustrating an example region 200. A region 200 is defined for an infrastructure 215. The infrastructure 215 includes a plurality of infrastructure elements 140 in communication with each other, e.g., via the network 135. The plurality of infrastructure elements 140 are provided to monitor the region 200 around the infrastructure elements 140, as shown in FIG. 2A. The region 200 may be, e.g., a neighborhood, a district, a city, a county, etc., or some portion thereof. The region 200 could alternatively be an area defined by a radius encircling the plurality of infrastructure elements 140 or some other distance or set of distances relative to the plurality of infrastructure elements 140.

In addition to vehicles 105, a region 200 can include other objects, e.g., a pedestrian, a bicycle object, a pole object etc., i.e., a region 200 could alternatively or additionally include many other objects, e.g., bumps, potholes, curbs, berms, fallen trees, litter, construction barriers or cones, etc. Objects can be specified as being located according to a coordinate system for an area maintained by the vehicle computer 110 and/or infrastructure 140 computer 155, e.g., according to a Cartesian coordinate system or the like specifying coordinates in the region 200. Additionally, data about an object could specify characteristics of a hazard or object in a sub-region such as on or near a road, e.g., a height, a width, etc.

Figure 2B:
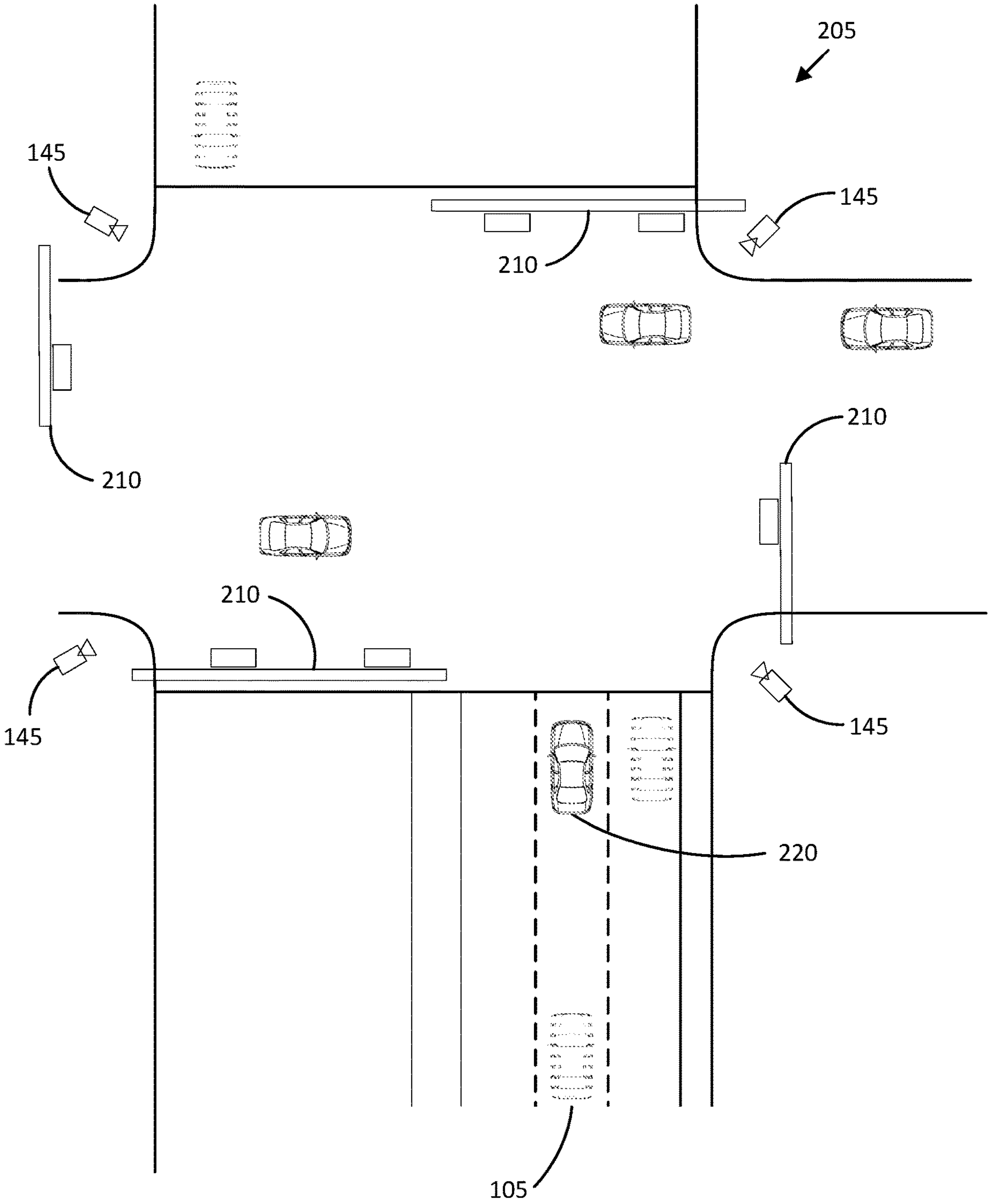
FIG. 2B is a diagram illustrating an example area within the region of FIG. 2 at which the system of FIG. 1 would be implemented.

The region 200 includes one or more areas 205, as shown in FIG. 2A. Each infrastructure element 140 in the region 200 is provided to monitor one respective area 205. Each area 205 is a subset that is an area of interest or focus for a particular traffic analysis, e.g., an intersection, a school zone, a railroad crossing, a construction zone, a crosswalk, etc., in the region 200, as shown in FIG. 2B. An area 205 is proximate to a respective infrastructure element 140. In the present context, "proximate" means that the area 205 is defined by a field of view of the infrastructure element 140 sensor 145. The area 205 could alternatively be an area defined by a radius around the respective infrastructure element 140 or some other distance or set of distances relative to the respective infrastructure element 140.

The infrastructure computer 155 (or the remote server computer 160) can determine operation data for the area 205. In this context, "operation data" are data describing movement and positions of vehicles relative to each other, i.e., operation data are data measuring various vehicle attributes as the vehicle operates in the area. The operation data can include, e.g., vehicle speed data, vehicle acceleration data, vehicle braking data, vehicle turning data, etc. That is, as vehicles operate in the area 205, the operation data provide measurements describing how the vehicles operate in the area 205.

The infrastructure computer 155 (or the remote server computer 160) can determine the operation data based on infrastructure sensor 145 data. For example, the infrastructure sensor 145 can capture data, e.g., image and/or video data, of the area 205 and transmit the data to the infrastructure computer 155. Video data can be in digital format and encoded according to conventional compression and/or encoding techniques, providing a sequence of frames of image data where each frame can have a different index and/or represent a specified period of time, e.g., 10 frames per second, and arranged in a sequence. The infrastructure computer 155 can then, for example, analyze the infrastructure sensor 145 data, e.g., using pattern recognition and/or image analysis techniques, to determine the operation data for the area 205. The infrastructure computer 155 can be programmed to transmit the operation data to the server 160, e.g., via the network 135. As another example, the infrastructure computer 155 can provide the infrastructure sensor 145 data to the remote server computer 160, e.g., via the network 135, and the remote server computer 160 can analyze the infrastructure sensor 145 data, e.g., using pattern recognition and/or image analysis techniques, to determine the operation data for the area 205.

Additionally, or alternatively, the infrastructure computer 155 (or the remote server computer 160) can determine the operation data based on signal phase and timing data (SPaT) for a traffic signal 210 in the area 205. For example, the traffic signal 210 may control traffic moving through the area 205 based on the SPaT data. SPaT data indicates a timing of a change of the traffic signal 210 from a current state to a next state. Changing states in this context means changing priorities for vehicles travelling through the area 205, such as, for example, changing a first light signal for a first direction of travel from green to red (reducing the priority for travel in the first direction), and changing the light signal for a second direction of travel from red to green (increasing the priority for travel in the second direction). Said differently, SPaT data indicates which light signal is currently energized and an amount of time until the light signal will no longer be energized and another light signal will be energized. The infrastructure computer 155 can store the SPaT data for the traffic signal 210, e.g., in a memory of the infrastructure computer 155. In such an example, the infrastructure computer 115 can provide the SPaT data to the remote server computer 160. As another example, the remote server computer 160 can store the SPaT data for the traffic signal 210, e.g., in a memory of the remote server computer 160.

Additionally, or alternatively, the infrastructure computer 155 (or the remote server computer 160) can determine the operation data based on aggregated data. Aggregated data means data from a plurality of vehicle computers 110 that provide messages that is combined arithmetically and/or mathematically, e.g., by averaging and/or using some other statistical measure. That is, the infrastructure computer 155 (or the remote server computer 160) may be programmed to receive messages from a plurality of vehicle computers 110 indicating operation data for the respective vehicles 105, e.g., determined based on vehicle 105 sensor 115 data. Based on the aggregated data indicating the operation data for the vehicles 105 in the area 205 (e.g., an average number of messages, a percentage of messages, etc., indicating the operation data), and taking advantage of the fact that messages from different vehicles 105 are provided independently of one another, the infrastructure computer 155 (or the remote server computer 160) can determine the operation data for the area 205 based on the vehicle 105 data. The infrastructure computer 155 (or the remote server computer 160) can then transmit the operation data to a plurality of vehicles, including the vehicle 105, e.g., via the network 135.

Upon determining the operation data for the area 205, the infrastructure computer 155 (or the remote server computer 160) can generate a look-up table, or the like, that associates the operation data for the area 205 with a corresponding time of day. That is, the operation data may vary for the area 205 based on a time of day. For example, the operation data may describe vehicle operations specific times of day, e.g., 7:00 am, 9:15 am, 4:30 pm, 6:45 pm, etc., in the area 205. The infrastructure computer 155 (or the remote server computer 160) may maintain a clock and, upon determining operation data for the area 205, can record a current time. The infrastructure computer 155 (or the remote server computer 160) can then update the look-up table to associate the current time with the operation data for the area 205. The infrastructure computer 155 can be programmed to provide the look-up table to the remote server computer 160, e.g., via the network 135.

The vehicle computer 110 is programmed to determine that the vehicle 105 is operating within the area 205. For example, the vehicle computer 110 can determine that the vehicle 105 is operating within the area 205 based on map data. The vehicle computer 110 can receive the map data of the area 205, e.g., from a remote server computer 160. The map data can, for example, specify a perimeter of the area 205, i.e., a geo-fence. A geo-fence herein has the conventional meaning of a boundary for an area defined by sets of geo-coordinates. The vehicle computer 110 may receive a location of the vehicle 105, e.g., from a sensor 115, a navigation system, a remote server computer 140, etc. The vehicle computer 110 can then compare the location of the vehicle 105 to a geo-fence for the area 205. The vehicle computer 110 can then determine that the vehicle 105 is within the area 205 based on the location of the vehicle 105 indicating the vehicle 105 is within the geo-fence.

As another example, the vehicle computer 110 can determine that the vehicle 105 is operating within the area 205 based on receiving information from the infrastructure computer 155, e.g., via V2X communications. For example, the infrastructure computer 155 may have a communication range that corresponds to a perimeter of the area 205, such that the vehicle computer 110 can communicate with, e.g., detect a message from, the infrastructure computer 115 when the vehicle 105 is within the area 205, but is unable to communicate with, e.g., detect the message from, the infrastructure computer 155 when the vehicle 105 is outside of the area 205. As another example, the vehicle computer 110 can receive infrastructure sensor 145 data from the infrastructure computer 155. In such an example, the infrastructure sensor 145 may have a field of view that includes the area 205. The infrastructure sensor 145 data may include the vehicle 105. The vehicle computer 110 can determine that the vehicle 105 is operating within the area 205 based on detecting the vehicle 105 in the infrastructure sensor 145 data, e.g., by using known object detection and/or identification techniques.

Upon determining that the vehicle 105 is operating within the area 205, the vehicle computer 110 can determine operation data for the area 205. For example, the vehicle computer 110 can receive the operation data for the area 205, e.g., from the infrastructure computer 155, the remote server computer 160, etc. For example, the vehicle computer 110 can maintain a clock and provide a current time to the infrastructure computer 155 (or the remote server computer 160). The infrastructure computer 155 (or the remote server computer 160) can access the look-up table and select the operation data corresponding to the current time. The infrastructure computer 155 (or the remote server computer 160) can then provide the operation data to the vehicle computer 110, e.g., via the network 135, V2X communications, etc. Additionally, or alternatively, the infrastructure computer 155 (or the remote server computer 160) can provide, to the vehicle computer 105, the SPaT data for the traffic signal 210 in the area 205 corresponding to the current time. Additionally, or alternatively, the vehicle computer 110 can store the operation data for the area 205 and/or the SPaT data in a memory of the vehicle computer 110, e.g., in a situation in which the vehicle 105 has previously operated in the area 205. In this situation, the vehicle computer 110 can access the memory of the vehicle computer 110 to retrieve the operation data and/or SPaT data.

The vehicle computer 110 can determine to stop the vehicle 105 based on the operation data. The vehicle computer 110 can estimate a stop time for the vehicle 105 in the area 205 based on the operation data. For example, the operation data may indicate that vehicles generally stop in the area 205 at specified times, e.g., 8:16 am, 9:22 am, 2:34 pm, 5:48 pm, etc., and are stopped for various durations, e.g., 45 seconds, 1 minute, 2 minutes, etc., based on the time of day. If the operation data indicates that vehicles are generally stopped in the area 205 at the current time, then the vehicle computer 110 can determine to stop the vehicle 105 in the area 205. If the operation data indicates that vehicles are generally moving through the area 205 at the current time, then the vehicle computer 110 can determine to continue operation of the vehicle 105 through the area 205.

Additionally, or alternatively, the vehicle computer 110 can determine to stop the vehicle 105 based on the SPaT data for the traffic signal 210 corresponding to the current time. For example, the SPaT data may specify times at which the traffic signal 210 changes states to prioritizes travel in a direction of than a direction of travel of the vehicle 105 and durations until the traffic signal 210 changes states to prioritize travel in the direction of travel of the vehicle 105. If the SPaT data indicates that the traffic signal 210 generally prioritizes travel in a direction other than the direction of travel of the vehicle 105 at the current time, then the vehicle computer 110 can determine to stop the vehicle 105 in the area 205. If the SPaT data indicates that the traffic signal 210 generally prioritizes travel in the direction of travel of the vehicle 105 at the current time, then the vehicle computer 110 can determine to continue operation of the vehicle 105 through the area 205.

Additionally, or alternatively, the vehicle computer 110 can determine to stop the vehicle 105 based on sensor 115 data. The vehicle computer 110 can, for example, receive sensor 115 data, e.g., image data, of the environment around the vehicle 105. The image data can include one or more objects in the environment around the vehicle 105. The vehicle computer 110 can identify the detected objects based on the sensor 115 data. For example, object identification techniques can be used, e.g., in the vehicle computer 110 based on LIDAR sensor 115 data, camera sensor 115 data, etc., to identify a type of object, e.g., a vehicle, a traffic signal, etc., as well as physical features of objects.

Any suitable techniques may be used to interpret sensor 115 data. For example, camera and/or LIDAR image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification of a user or an indication that no user is present in the respective region of interest. Further, a coordinate system (e.g., polar or cartesian) applied to an area proximate to the vehicle 105 can be applied to specify locations and/or areas (e.g., according to the vehicle 105 coordinate system, translated to global latitude and longitude geo-coordinates, etc.) of a user identified from sensor 115 data. Yet further, the vehicle computer 110 could employ various techniques for fusing (i.e., incorporating into a common coordinate system or frame of reference) data from different sensors 115 and/or types of sensors 115, e.g., LIDAR, radar, and/or optical camera data.

Upon identifying the type of an object as a traffic signal 210, the vehicle computer 110 can analyze the image data, e.g., using image and/or pattern recognition techniques, to determine the current state of the traffic signal 210. Upon determining that the current state prioritizes travel in a direction other than the direction of travel of the vehicle 105, e.g., the traffic signal 210 is displaying a red light towards the vehicle 105, the vehicle computer 110 can determine to stop the vehicle 105. Upon determining that the current state prioritizes travel in the direction of travel of the vehicle 105, e.g., the traffic signal 210 is displaying a green light towards the vehicle 105, the vehicle computer 110 can determine to continue operation of the vehicle 105 through the area 205.

Upon identifying the type of object as another vehicle 220, e.g., in a situation in which a traffic signal 210 is not within a field of view of the vehicle 105 sensors 115, the vehicle computer 110 can determine a speed of the other vehicle 220. Upon determining that the other vehicle 220 is stopped, the vehicle computer 110 can determine to stop the vehicle 105. Upon determining that the other vehicle 220 is moving, the vehicle computer 110 can determine to continue operation of the vehicle 105 through the area 205.

The vehicle computer 110 may determine a speed of the other vehicle 220 relative to the vehicle 105 by determining a change in distance between the other vehicle 220 and the vehicle 105 over time. For example, the vehicle computer 110 determine the speed of other vehicle 220 relative to the vehicle 105 with the formula $\Delta D/\Delta T$, where $\Delta D$ is a difference between a pair of distances from the vehicle 105 to the other vehicle 220 taken at different times and $\Delta T$ is an amount of time between when the pair of distances was determined. For example, the difference between the pair of distances $\Delta D$ may be determined by subtracting the distance determined earlier in time from the distance determined later in time. In such an example, a positive value indicates that the other vehicle 220 is traveling slower than the vehicle 105, and a negative value indicates that the other vehicle 220 is traveling faster than the vehicle 105. The vehicle computer 110 can then determine the speed of the other vehicle 220 by combining, i.e., summing, the speed of the other vehicle 220 relative to the vehicle 105 to the speed of the vehicle 105 (e.g., determined based on sensor 115 data, such as wheel speed sensor data). As another example, the vehicle computer 110 may receive the speed of the other vehicle 220, e.g., via V2V communications.

The vehicle computer 110 can actuate one or more components 125 to control vehicle operation. For example, the vehicle computer 110 can actuate a brake component 125 to stop the vehicle 105. As another example, the vehicle computer 110 can actuate a propulsion component 125 to operate the vehicle 105 through the area 205.

Upon determining to stop the vehicle 105 in the area 205, the vehicle computer 110 can estimate a stop time for the vehicle 105 in the area 205. A "stop time" is an amount of time that the vehicle 105 will remain stopped in the area 205. As one example, the vehicle computer 110 can estimate the stop time based on the operation data. In this example, the vehicle computer 110 can estimate the stop time based on the current time occurring when the operation data indicates that vehicles are generally stopped in the area 205. The stop time can be estimated based on a difference between the current time and a first to occur future time at which the operation data indicates that vehicles generally move through the area 205.

Additionally, or alternatively, the vehicle computer 110 can estimate the stop time for the vehicle 105 based on the SPaT data for the traffic signal 210. In this example, the vehicle computer 110 can estimate the stop time based on the current time occurring when the SPaT data indicates that the traffic signal 210 state prioritizes travel in a direction other than the direction of travel of the vehicle 105. The stop time can be estimated based on a difference between the current time and a first to occur time at which the traffic signal 210 state changes to prioritize travel in the direction of the vehicle 105.

In addition to estimating the stop time, the vehicle computer 110 is programmed to identify one or more available sensors 115 to transition from a standard power mode to a low power mode based on the estimated stop time. For example, the vehicle computer 110 may maintain a look-up table, or the like, that associates various sensors 115 with corresponding stop times. The look-up table may specify various sensors 115 that can be transitioned from a standard power mode to a low power mode and back to the standard power mode within the associated stop time. That is, different sensors 115 may be available to transition from the standard power mode to the low power mode within different stop times. The vehicle computer 110 can, for example, access the look-up table and determine the sensor(s) 115 based on the stored stop time matching the estimated stop time.

In the standard power mode, sensors 115 draw power from a power supply to perform all operations, such as obtaining data from a full field of view and providing the data to the vehicle computer 110 for use in operating the vehicle 105. The power supply provides electricity to one or more components 125 and sensors 115. The power supply can include one or more batteries, e.g., 12-volt lithium-ion batteries, and one or more power networks to supply power from the batteries to the components 125 and sensors 115.

In the low power mode, the sensors 115 may draw power from the power supply for less than all operation when the sensors 115 are in the standard power mode. That is, the sensors 115 may draw power for a specific, limited set of operations to conserve energy when the vehicle 105 is not in use, i.e., stopped at a traffic signal. For example, the sensors 115 may be substantially powered off, have a reduced field of view, delay providing data to the vehicle computer 110, etc.

Upon identifying a sensor 115 that is available to transition to the low power mode, the vehicle computer 110 can be programmed to verify that the identified sensor 115 is available to transition to the low power mode. To verify that the identified sensor 115 is available to transition to the low power mode, the vehicle computer 110 can obtain data from other sensors 115 identified to remain in the standard power mode. Additionally, or alternatively, the vehicle computer 110 can receive infrastructure sensor 145 data from the infrastructure computer 155, e.g., via V2X communications.

The vehicle computer 110 can then input the data from the other sensors 115 in the standard power mode and the infrastructure sensor 145 data into a neural network, such as a deep neural network 400 (DNN). (See FIG. 4). The DNN 400 can be trained to accept the sensor 115 data and the infrastructure sensor 145 data as input and generate an output of a status of vehicle operation. The status of vehicle operation is one of verified or unverified. The status of vehicle operation is verified when the vehicle computer 110 is receiving sufficient data, e.g., specified types, amounts, etc., to operate the vehicle 105. The status of vehicle operation is unverified when the vehicle computer 110 is receiving insufficient data to operate the vehicle 105. Upon determining that the status of vehicle operation is verified with the sensor 115, 145 data input to the DNN 400, the vehicle computer 110 can verify that the identified sensor 115 is available to transition to the low power mode. Upon determining that the status of vehicle operation is unverified with the sensor 115, 145 data input to the DNN 400, the vehicle computer 110 can determine that the identified sensor 115 is not available to transition to the low power mode.

Additionally, or alternatively, the vehicle computer 110 may be programmed to identify one or more available sensors 115 to transition from the standard power mode to a maintenance mode (as discussed below) based on data obtained by the sensor 115 in the standard power mode. For example, the vehicle computer 110 can analyze sensor 115 data to determine a presence or an absence of a fault. In this context, a "fault" is a condition of the sensor 115 that impairs operation and/or gives rise to repair and/or maintenance needs. A fault can include a defect or degradation of the sensor 115. That is, the fault indicates a detection that the sensor 115 is not operating within one or more specified parameters.

The vehicle computer 110 can perform a conventional diagnostic test to detect faults in a sensor 115. Typically, to perform a diagnostic test, the vehicle computer 110 receives data from the sensor 115. The vehicle computer 110 then determines whether the sensor 115 is capable of operation based on comparing the sensor 115 data to specified parameters. If the sensor 115 data is outside of the specified parameters, then the vehicle computer 110 determines and outputs a fault. That is, if the vehicle computer 110 determines a fault in the sensor 115, the data indicates that the sensor requires repair or replacement. The vehicle computer 110 can then identify the fault based on a look-up table, e.g., stored in a memory of the vehicle computer 110. The look-up table may associate various faults with corresponding sensor 115 data. The vehicle computer 110 can, for example, access the look-up table and identify the fault based on stored sensor 115 data matching the obtained sensor 115 data. Upon identifying the fault, the vehicle computer 110 can, for example, generate a Diagnostic Trouble Code (DTC), OBD-II Trouble Code, or the like, and store the DTC, e.g., in the memory of the vehicle computer 110.

Upon determining a presence of a fault in a sensor 115, the vehicle computer 110 can determine that the sensor 115 is available to transition to the maintenance mode. In a situation in which one sensor 115 is identified as available to transition to both the low power mode and the maintenance mode, the vehicle computer 110 can determine that the one sensor 115 is available to transition to the maintenance mode instead of the low power mode. That is, the vehicle computer 110 can give preference to repairing the one sensor 115 over reducing energy consumption by the one sensor 115. Upon determining an absence of a fault in a sensor 115, the vehicle computer 110 can determine that the sensor 115 is not available to transition to the maintenance mode.

Figure 3:
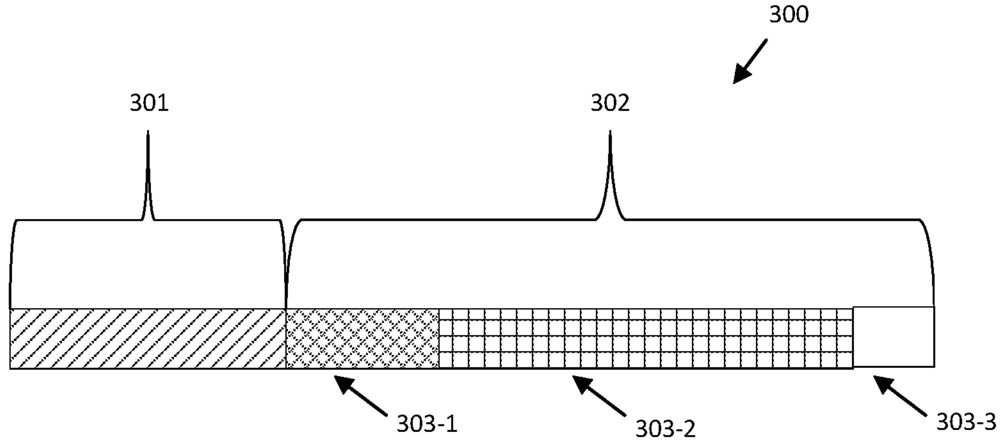
FIG. 3 is a block diagram illustrating an example request message.

Additionally, the vehicle computer 110 can generate a message. A message includes a header 301 and a payload 302 (see FIG. 3). The header 301 of the message 300 may include a message type, a message size, etc. The payload 302 may include various data, i.e., message content. The payload 302 can include sub-payloads or payload segments 303-1, 303-2, 303-3 (collectively, referred to as payload segments 303). The respective payload segments 303 in FIG. 3 are illustrated as being of different lengths to reflect that different payload segments 303 may include various amounts of data, and therefore may be of different sizes, i.e., lengths. The payload 302 of the message 300 can includes, e.g., in specified payload segments 303, the data obtained by the sensor 115 in the standard power mode and/or data specifying the identified fault, e.g., the DTC.

Upon generating the message 300, the vehicle computer 110 can provide the message 300 to the remote server computer 160. For example, the vehicle computer 110 can transmit the message 300 to the remote server computer 160 via the network 135.

In the maintenance mode, the vehicle computer 110 can actuate the sensor 115 to perform one or more maintenance and/or repair operations. The vehicle computer 110 can determine a maintenance and/or repair operation based on the fault. For example, upon determining that the fault is transient, i.e., a fault that may be resolved upon cycling power to the associated sensor 115, the vehicle computer 110 can reset the sensor 115. That is, the vehicle computer 110 can instruct the power supply to prevent providing power to the sensor 115, e.g., for a specified amount of time, and then to resume providing power to the sensor 115. In such an example, the vehicle computer 110 may determine that the fault was resolved based on failing to detect the fault via subsequent diagnostic tests. To resolve the fault means that the condition that initiated the fault is no longer present.

As another example, upon determining that the fault is a calibration fault, i.e., a fault that may be resolved upon re-calibration of the sensor 115, the vehicle computer 110 can calibrate the sensor 115, e.g., according to known self-calibration techniques. For example, the vehicle computer 110 can receive data from the sensor 115 to be calibrated and another sensor 115 that has an overlapping field of view with the sensor 115 to be calibrated. The vehicle computer 110 can then compare the data from the sensor 115 to be calibrated to the data from the other sensor 115 to determine an offset between features detected within the overlapping fields of view. The vehicle computer 110 can then update parameters for the sensor 115 based on the offset. That is, the vehicle computer 110 can adjust the sensor 115 to minimize or reduce the offset.

The vehicle computer 110 can determine the fault is a transient or calibration fault based on a look-up table or the like, e.g., stored in a memory of the vehicle computer 110. The look-up table may associate various faults with either transient or calibration faults. The vehicle computer 110 can, for example, access the look-up table and determine the detected fault is a transient or calibration fault based on a stored fault matching the detected fault.

Upon determining that the vehicle 105 is stopped, the vehicle computer 110 compares the estimated stop time to a first threshold. The vehicle computer 110 can determine that the vehicle 105 is stopped based on sensor 115 data, e.g., wheel speed sensor 115 data. The first threshold may be stored, e.g., in the memory of the vehicle computer 110. The first threshold may be determined empirically, e.g., based on testing that allows for determining an amount of time for sensors to transition from the standard power mode to another mode and back to the standard power mode. As another example, the vehicle computer 110 may maintain a look-up table that associates various first thresholds with corresponding available sensors 115. The vehicle computer 110 can access the look-up table to select the first threshold associated with a stored sensor 115 that matches an available sensor 115. If the estimated stop time is greater than the first threshold, then the vehicle computer 110 transition the available sensor(s) 115 to the low power mode or the maintenance mode. If the estimated stop time is less than or equal to the first threshold, then the vehicle computer 110 maintains, i.e., keeps, the available sensor(s) 115 in the standard power mode.

Additionally, the vehicle computer 110 can determine a remaining stop time. A "remaining stop time" is an amount of time until the vehicle 105 is expected to move. For example, the vehicle computer 110 can determine the specified stop time that was last to occur prior to the current time. The vehicle computer 110 can then determine the remaining stop time based on, for example, the operation data. In such an example, the vehicle computer 110 can determine an updated current time, e.g., via the maintained clock, and determine the remaining stop time based on a difference between the updated current time and a next to occur future time at which the operation data indicates that vehicles generally move through the area 205. Additionally, or alternatively, the vehicle computer 110 can determine the remaining stop time based on the SPaT data. In such an example, the vehicle computer 110 can determined the updated current time, and determine the remaining stop time based on a difference between the updated current time and a next to occur time at which the traffic signal state changes to prioritize travel in the direction of the vehicle 105.

The vehicle computer 110 can compare the remaining stop time to a second threshold. The second threshold may be stored, e.g., in the memory of the vehicle computer 110. The second threshold may be determined empirically, e.g., based on testing that allows for determining a maximum amount of time for sensors to transition from the low power mode to the standard power mode. As another example, the vehicle computer 110 may maintain a look-up table that associates various second thresholds with corresponding sensors 115 that are in the lower power mode. The vehicle computer 110 can access the look-up table to select the second threshold associated with a stored sensor 115 that matches a sensor 115 in the low power mode. If the remaining stop time is greater than the second threshold, then the vehicle computer 110 maintains, i.e., keeps, the available sensor(s) 115 in the low power mode. If the remaining stop time is less than or equal to the second threshold, then the vehicle computer 110 transitions the available sensor(s) 115 to the standard power mode.

While stopped, the vehicle computer 110 can determine to move the vehicle 105. For example, the vehicle computer 110 can receive data from sensors 115 that remained in the standard power mode. Additionally, or alternatively, the vehicle computer 110 can receive infrastructure sensor 145 data, e.g., via V2X communications. Based on the sensor 115, 145 data, the vehicle computer 110 can determine to move the vehicle 105. For example, the vehicle computer 110 can analyze the sensor 115, 145 data to detect a change in status of the traffic signal, as discussed above. As another example, the vehicle computer 110 can analyze the sensor 115, 145 data to detect other vehicles moving in the direction of travel of the vehicle 105, as discussed above. As yet another example, the vehicle computer 110 can receive data from the other vehicles, e.g., via V2V communications, indicating that the other vehicles are moving.

Upon determining to move the vehicle 105, the vehicle computer 110 can actuate the propulsion component 125. In a situation in which the available sensor(s) 115 have not transitioned to the standard power mode prior to the vehicle computer 110 determining to move the vehicle 105. The vehicle computer 110 can operate the vehicle 105 based on data from the sensors 115 in the standard power mode and infrastructure sensor 145 data. For example, the vehicle computer 110 can generate a path using the sensor 115, 145 data. The infrastructure sensor 145 data may supplement the vehicle 105 sensor 115 data during a transition period for the available sensor(s) 115 to return to the standard power mode, which reduces a likelihood of vehicle operation being delayed during the transition period.

The vehicle computer 110 can generate the path, e.g., to avoid detected objects, to reach a destination specified by a user input, etc., As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \tag{1}$$

where $a_0$ an offset, i.e., a lateral distance between the path and a center line of the vehicle 105 at the upcoming distance x, $a_1$ is a heading angle of the path, $a_2$ is the curvature of the path, and $a_3$ is the curvature rate of the path.

Figure 4:
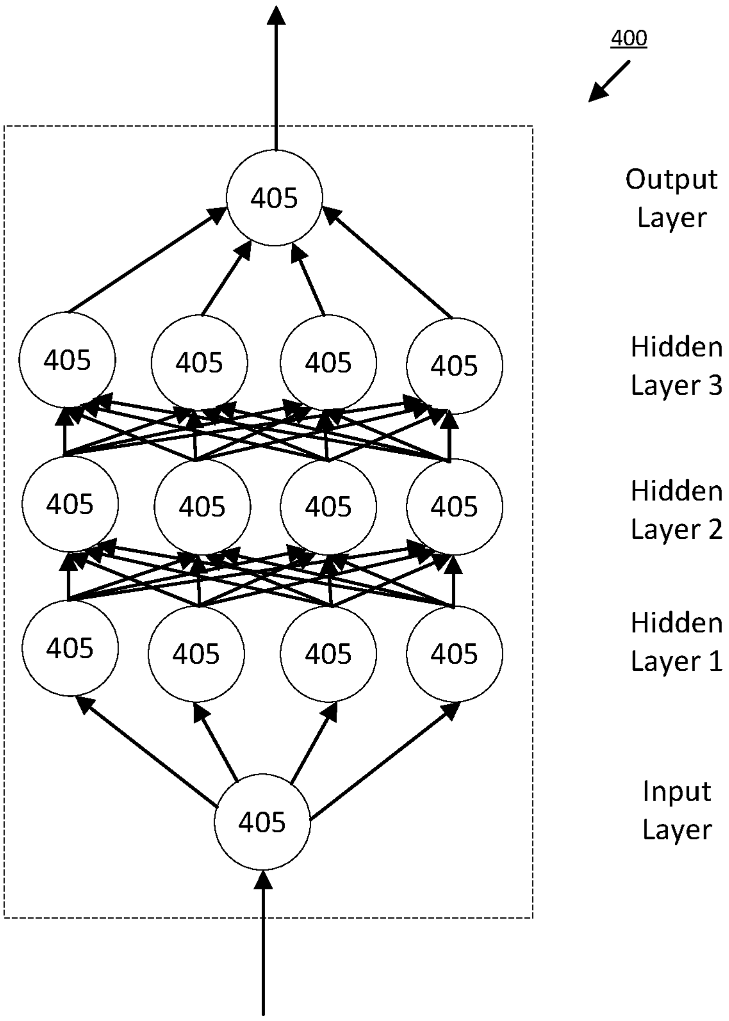
FIG. 4 is an example diagram of a deep neural network.

FIG. 4 is a diagram of an example deep neural network (DNN) 400 that can be trained to verify vehicle operation based on data from sensors 115 in the standard power mode and infrastructure sensor 145 data. The DNN 400 can be a software program that can be loaded in memory and executed by a processor included in a computer, for example. In an example implementation, the DNN 400 can include, but is not limited to, a convolutional neural network (CNN), R-CNN (Region-based CNN), Fast R-CNN, and Faster R-CNN. The DNN 400 includes multiple nodes, and the nodes are arranged so that the DNN 400 includes an input layer, one or more hidden layers, and an output layer. Each layer of the DNN 400 can include a plurality of nodes 405. While FIG. 4 illustrates two hidden layers, it is understood that the DNN 400 can include additional or fewer hidden layers. The input and output layers for the DNN 400 may include more than one node 405.

The nodes 405 are sometimes referred to as artificial neurons 405 because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to an activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

As one example, the DNN 400 can be trained with ground truth data, i.e., data about a real-world condition or state. For example, the DNN 400 can be trained with ground truth data and/or updated with additional data by a processor of the remote server computer 140. Weights can be initialized by using a Gaussian distribution, for example, and a bias for each node 405 can be set to zero. Training the DNN 400 can include updating weights and biases via suitable techniques such as back-propagation with optimizations. Ground truth data used for training can include, but is not limited to, data manually labeled by human operators as specifying data that allows the vehicle computer 110 to operate the vehicle 105.

During operation, the vehicle computer 110 obtains data from sensors 115 in the standard power mode. Additionally, the vehicle computer 110 can receive infrastructure sensor 145 data from the infrastructure computer 155 in the area 205. The vehicle computer 110 provides the sensor 115, 145 data to the DNN 400. The DNN 400 generates an output based on the received input. The output is a status of vehicle operation, i.e., verified or unverified, indicating whether the vehicle computer 110 can operate the vehicle 105 based on the sensor 115, 145 data.

Figure 5:
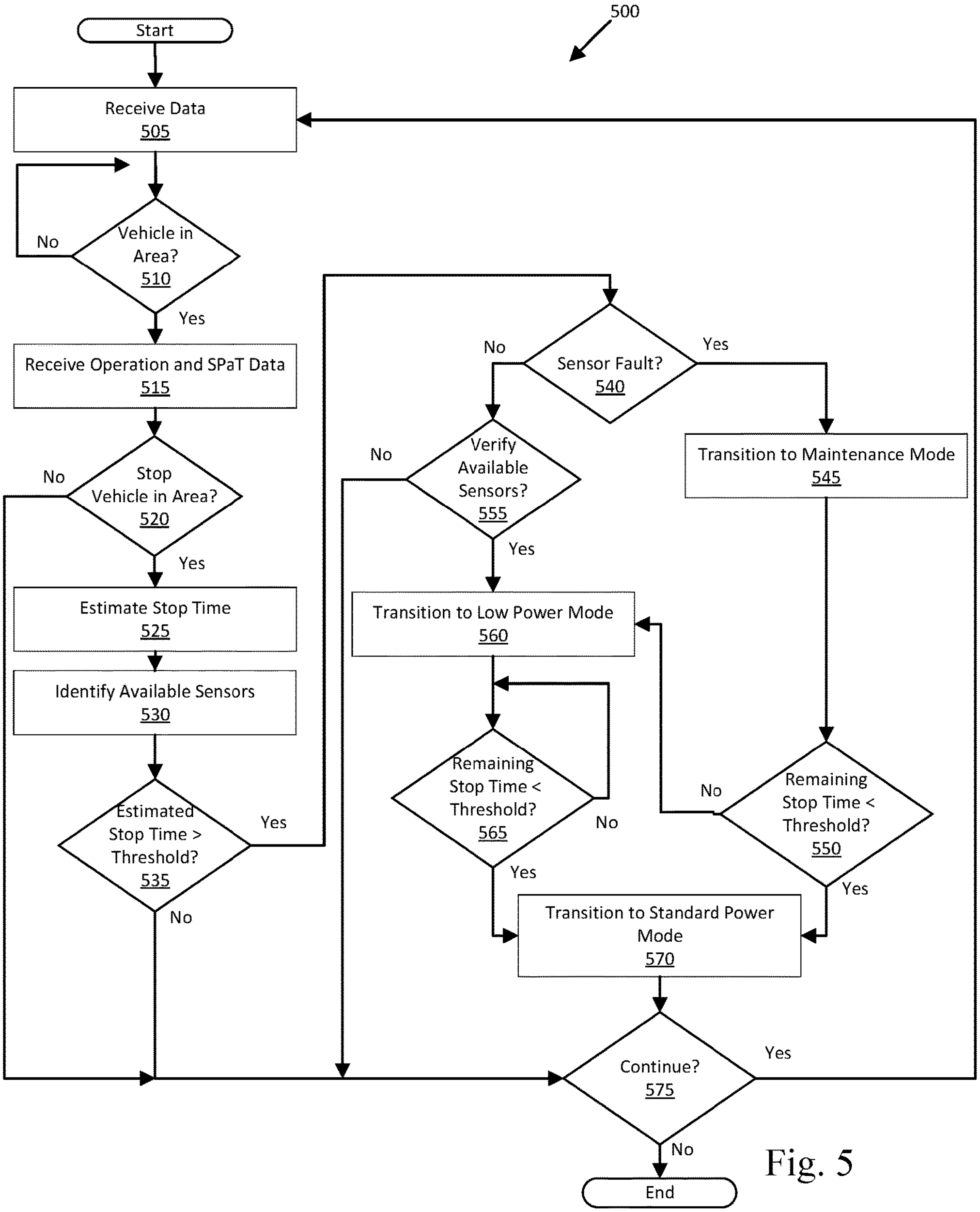
FIG. 5 is a flowchart of an example process for controlling vehicle sensors to transition to and from a standard power mode.

FIG. 5 is a diagram of an example process 500 executed in a vehicle computer 110 according to program instructions stored in a memory thereof for biometrically authorizing a user. Process 500 includes multiple blocks that can be executed in the illustrated order. Process 500 could alternatively or additionally include fewer blocks or can include the blocks executed in different orders.

Process 500 begins in a block 505. In the block 505, the vehicle computer 110 receives data from one or more sensors 115, e.g., via a vehicle network, from a remote server computer 140, e.g., via a network 135, and/or from a computer in another vehicle, e.g., via V2V communications, as discussed above. Additionally, the vehicle computer 110 can receive infrastructure sensor 145 data from an infrastructure element 140, as discussed above. The process 500 continues in a block 510.

In the block 510, the vehicle computer 110 determines whether the vehicle 105 is within an area 205. The vehicle computer 110 can determine that the vehicle 105 is within the area 205 based on a location of the vehicle 105 and a geo-fence of the area 205, as discussed above. Additionally, or alternatively, the vehicle computer 110 can determine that the vehicle 105 is within the area 205 based on initiating communication with the infrastructure element 140 in the area 205 or detecting the vehicle 105 in the infrastructure sensor 145 data, as discussed above. If the vehicle 105 is within the area 205, then the process 500 continues in a block 515. Otherwise, the process 500 continues in a block 570.

In the block 515, the vehicle computer 110 determines operation data for the area 205. Additionally, the vehicle computer 110 determines SPaT data for a traffic signal 210 in the area 205. The vehicle computer 110 can retrieve the operation data and/or the SPaT data from a memory of the vehicle computer 110, and/or can receive the operation data and/or SPaT data, e.g., from a remote server computer 160 or an infrastructure computer 155 in the area 205, as discussed above. The process 500 continues in a block 520.

In the block 520, the vehicle computer 110 can determine whether to stop the vehicle 105 in the area 205. For example, the vehicle computer 110 can determine to stop the vehicle 105 based on sensor 115 data, the operation data, and/or the SPAT data, as discussed above. If the vehicle computer 110 determines to stop the vehicle 105, then the process 500 continues in a block 525. Otherwise, the process 500 continues in the block 575.

In the block 525, the vehicle computer 110 estimates a stop time for the vehicle 105 in the area 205. The vehicle computer 110 can estimate the stop time based on the operation data and/or the SPaT data, as discussed above. The process 500 continues in a block 530.

In the block 530, the vehicle computer 110 identifies available sensors 115 to transition from a standard power mode to a low power mode. The vehicle computer 110 identifies the available sensors 115 based on the estimated stop time, as discussed above. The process 500 continues in a block 535.

In the block 535, the vehicle computer 110 determines whether the estimated stop time is greater than a first threshold. The vehicle computer 110 can compare the estimated stop time to the first threshold. If the estimated stop time is greater than the first threshold, then the process continues in a block 540. Otherwise, the process 500 continues in the block 575.

In the block 540, the vehicle computer 110 determines whether a sensor 115 fault is present. The vehicle computer 110 can receive data from the sensors 115 and detect a presence or absence of a fault using self-diagnostic testing, as discussed above. If the vehicle computer 110 determines a presence of a fault in a sensor 115, then the process 500 continues in a block 545. Additionally, the vehicle computer 110 can provide a message 300 identifying the sensor 115 and the fault to the remote server computer 160, as discussed above. If the vehicle computer 110 determines an absence of a fault in a sensor 115, then the process 500 continues in a block 555.

In the block 545, the vehicle computer 110 transitions the sensor(s) 115 associated with the detected fault(s) from a standard power mode to a maintenance mode upon stopping the vehicle 105. In the maintenance mode, the vehicle computer 110 can perform one or more maintenance/repair operations on the sensor(s) 115 based on the identified fault(s), as discussed above. The process 500 continues in a block 550.

In the block 550, the vehicle computer 110 determines whether a remaining stop time is greater than a second threshold. The vehicle computer 110 can determine the remaining stop time based on an updated current time and the operation data and/or SPaT data, as discussed above. The vehicle computer 110 can compare the remaining stop time to the second threshold. If the remaining stop time is greater than the second threshold, then the process 500 continues in a block 560. Otherwise, the process 500 continues in a block 570.

In the block 555, the vehicle computer 110 verifies that the sensors 115 identified in the block 530 are available. For example, the vehicle computer 110 can obtain sensor 115 data from sensors 115 that will remain in the standard power mode, as discussed above. Additionally, or alternatively, the vehicle computer 110 can receive infrastructure sensor 145 data from the infrastructure computer 155 in the area 205, as discussed above. The vehicle computer 110 can then input the sensor 115, 145 data into a DNN 400 that outputs a verification of the available sensors 115. If the vehicle computer 110 verifies at least one available sensor 115, then the process 500 continues in the block 560. Otherwise, the process 500 continues in the block 575.

In the block 560, the vehicle computer 110 transitions the available sensor(s) 115 from the standard power mode to the low power mode. Additionally, the vehicle computer 110 can transition the sensor(s) 115 associated with detected fault(s) from the maintenance mode to the low power mode. The process 500 continues in a block 565.

In the block 565, the vehicle computer 110 determines whether the remaining stop time is greater than the second threshold. The block 565 is substantially identical to the block 550 of the process 500 therefore will not be described further to avoid redundancy. If the remaining stop time is greater than the second threshold, then the process 500 remains in the block 565. Otherwise, the process 500 continues in a block 570.

In the block 570, the vehicle computer 110 transitions the sensor(s) 115 to the standard power mode. The process 500 continues in a block 575.

In the block 575, the vehicle computer 110 determines whether to continue the process 500. For example, the vehicle computer 110 can determine not to continue when the vehicle 105 is powered off. Conversely, the vehicle computer 110 can determine to continue when the vehicle 105 is powered on. If the vehicle computer 110 determines to continue, the process 500 returns to the block 505. Otherwise, the process 500 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as “a,” “the,” “said,” etc. should be read to recite one or more of the indicated elements unless a claim recites an explicit limitation to the contrary.

What is claimed is:

1. A system, comprising a computer including a processor and a memory, the memory storing instructions executable by the processor programmed to:

upon determining that a vehicle is operating within an area, estimate a stop time for the vehicle in the area based on operation data from an infrastructure element in the area;

identify a vehicle sensor that is available to transition to a low power mode based on the estimated stop time; and upon stopping the vehicle in the area, transition the available vehicle sensor to the low power mode based on the estimated stop time being greater than a first threshold and based on verifying vehicle operation with the available vehicle sensor in the low power mode.

2. The system of claim 1, wherein the instructions further include instructions to determine the estimated stop time based additionally on signal phase and timing (SPaT) data for a traffic signal in the area.

3. The system of claim 1, wherein the instructions further include instructions to determine the operation data associated with a time of day.

4. The system of claim 1, wherein the instructions further include instructions to receive the operation data from the infrastructure element.

5. The system of claim 1, wherein the infrastructure element includes an infrastructure sensor positioned to monitor the area, and wherein the instructions further include instructions to verify vehicle operation with the available sensor in the low power mode by inputting data from the infrastructure sensor and data from other vehicle sensors in a standard power mode to a neural network that outputs a verification status of vehicle operation.

6. The system of claim 1, wherein the instructions further include instructions to identify the available vehicle sensor based additionally on data obtained from the available vehicle sensor in a standard power mode.

7. The system of claim 1, wherein the instructions further include instructions to, upon identifying a fault associated with the available vehicle sensor, transition the available sensor to a maintenance mode based on the estimated stop time being greater than the threshold.

8. The system of claim 7, wherein the instructions further include instructions to identify the fault associated with the available sensor based on data obtained from the available vehicle sensor in a standard power mode.

9. The system of claim 8, wherein the instructions further include instructions to provide the data obtained from the available vehicle sensor to a remote computer.

10. The system of claim 7, wherein the instructions further include instructions to provide, to a remote computer, a message specifying the identified fault.

11. The system of claim 7, wherein the instructions further include instructions to calibrate the available vehicle sensor in the maintenance mode.

12. The system of claim 7, wherein the instructions further include instructions to reset the available vehicle sensor in the maintenance mode.

13. The system of claim 1, wherein the second threshold is less than the first threshold.

14. The system of claim 1, wherein the instructions further include instructions to:

after stopping the vehicle in the area, determine a remaining stop time based on the operation data; and transition the available vehicle sensor to a standard power mode based on the remaining stop time being less than or equal to a second threshold.

15. The system of claim 14, wherein the instructions further include instructions to determine the remaining stop time based additionally on signal phase and timing (SPaT) data for a traffic signal in the area.

16. A method, comprising:

upon determining that a vehicle is operating within an area, estimating a stop time for the vehicle in the area based on operation data from an infrastructure element in the area;

identifying a vehicle sensor that is available to transition to a low power mode based on the estimated stop time; and upon stopping the vehicle in the area, transitioning the available vehicle sensor to the low power mode based on the estimated stop time being greater than a first threshold and based on verifying vehicle operation with the available vehicle sensor in the low power mode.

17. The method of claim 16, further comprising identifying the available vehicle sensor based additionally on data obtained from the available vehicle sensor in a standard power mode.

18. The method of claim 16, further comprising, upon identifying a fault associated with the available vehicle sensor, transitioning the available sensor to a maintenance mode.

19. The method of claim 16, wherein the second threshold is less than the first threshold.

20. The method of claim 16, further comprising:

after stopping the vehicle in the area, determining a remaining stop time based on the operation data; and transitioning the available vehicle sensor to a standard power mode based on the remaining stop time being less than or equal to a second threshold.

21. The method of claim 16, wherein the infrastructure element includes an infrastructure sensor positioned to monitor the area, the method further comprising:

verifying vehicle operation with the available sensor in the low power mode by inputting data from the infrastructure sensor and data from other vehicle sensors in a standard power mode to a neural network that outputs a verification status of vehicle operation.

* * * * *